UNITED STATES PATENT OFFICE.

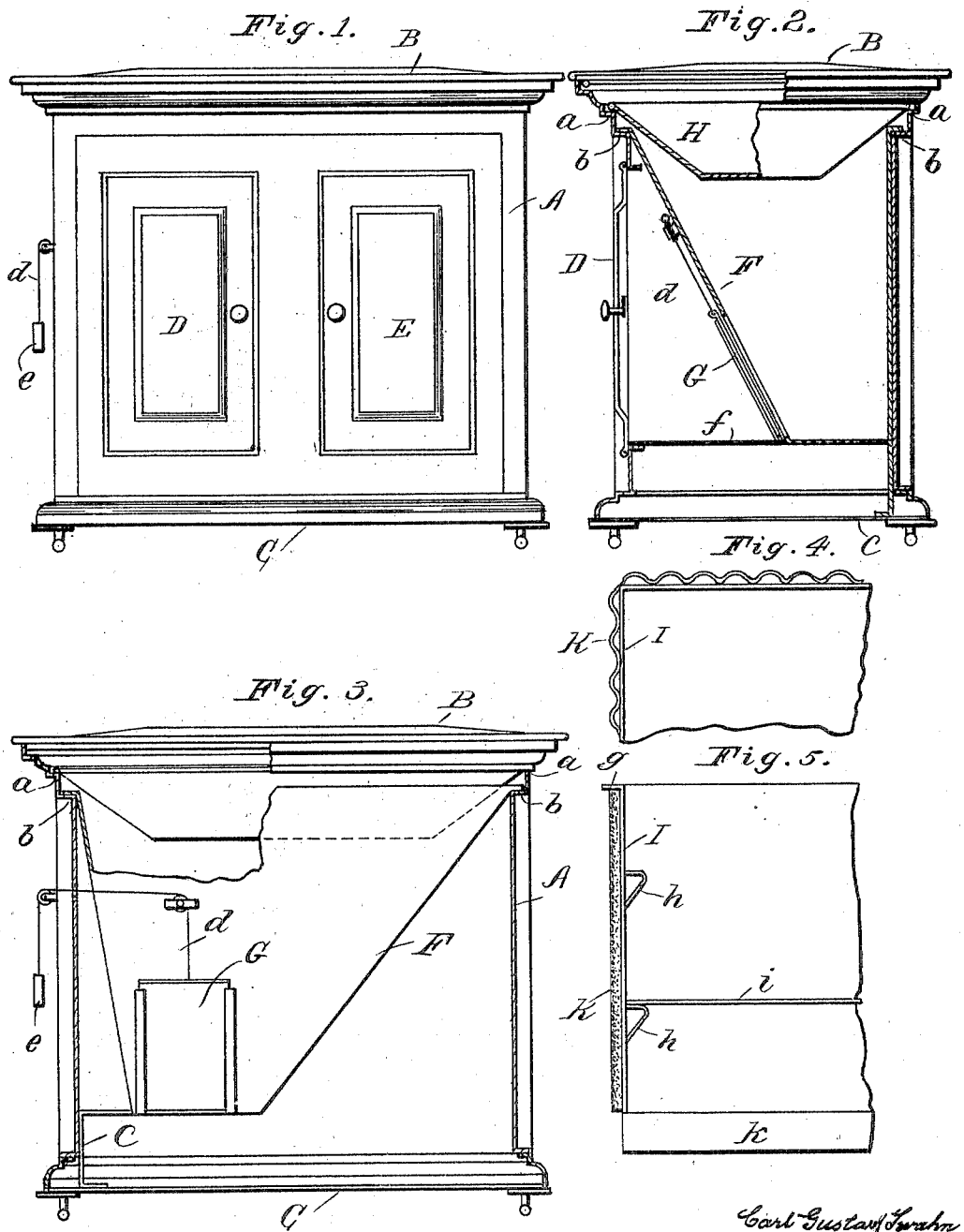

CARL GUSTAVF SWAHN, OF NEW YORK, N. Y.

KITCHEN-CABINET.

No. 817,202.  Specification of Letters Patent.  Patented April 10, 1906.

Application filed April 14, 1905. Serial No. 255,506.

*To all whom it may concern:*

Be it known that I, CARL GUSTAVF SWAHN, a subject of the King of Sweden and Norway, and a resident of the city of New York, in the county and State of New York, have invented certain new and useful Improvements in Kitchen-Cabinets, of which the following, taken in connection with the accompanying drawings, is a full, clear, and exact specification, sufficient to enable others skilled in the art to make and use the same.

My invention has relation to that class of devices known as "kitchen-cabinets" and intended to be employed for the accommodation of various kitchen supplies and kitchen utensils and to afford convenient access thereto.

The object of my invention is to provide or produce a simple, cheap, and convenient kitchen-cabinet which may be employed for containing a supply of coal and also a supply of wood with convenient means of access thereto both for charging and removing these supplies, having also a removable compartment or tray suitable for containing dishes or cutlery, and which cabinet may be easily converted into an ice-box by use of appropriate means for the reception of ice and the storage of provisions.

To accomplish the above-mentioned objects and to secure other and further advantages and conveniences in the matters of construction, operation, and use, my improvements involve certain novel and useful arrangements or combinations of parts and peculiar features of construction, all of which will be herein first fully described and then pointed out in the claims.

In the accompanying drawings, forming part of this specification, Figure 1 is a front elevation of my improved kitchen-cabinet. Fig. 2 is a vertical section and elevation on a plane perpendicular to the front of the cabinet and through the door which closes the discharge-opening in the coal-chute or coal-compartment. Fig. 3 is a vertical section and elevation on a plane parallel with the front of the cabinet and in front of the coal-chute door. Fig. 4 is a horizontal view, and Fig. 5 a vertical view, showing the general construction and arrangement of the ice and provision receptacle intended to replace the removable coal-compartment when required.

In all the figures like letters of reference, wherever they occur, indicate corresponding parts.

A represents the casing of the cabinet, which casing is preferably made of metal and may be made of any desired size and in ornamental form, as may be preferred. Of this casing, B is the cover extending over the entire interior and made removable to afford access to the interior, and this cover is preferably hinged or mounted so as to slide, after the manner of the top covers of the ordinary forms of ice-boxes or coal-boxes having such removable covers.

C represents the bottom plate.

The cabinet is preferably molded at top and formed in more or less ornamental design, and the casing is supplied with doors in the front, as represented at D and E. The top molding is preferably fashioned so as to afford ledges, as at $a$ and $b$, which will operate to sustain flanges or rims on the vessels or pockets which are located within the cabinet and form separable parts thereof.

F is a pocket for coal, the same being open at the top where it is supplied with a marginal flange to rest upon the ledge $b$ and closed at bottom at a little distance from the bottom of the cabinet, the bottom of this pocket being supplied with an extension-piece $c$, reaching down to the bottom plate C and located so as to come about to the end wall of the cabinet. This extension-piece operates to sustain a part of the weight of the pocket and its contents. The coal-pocket F has a vertical wall at the back of the cabinet, as indicated in Fig. 2; but the front wall is inclined, as are also the end walls, as indicated in Fig. 3. The bottom of this coal-pocket being sustained above the bottom plate C, the space beneath the coal-pocket, as also the triangular space between the end wall and the wall of the cabinet, is intended for containing a supply of wood, which may be introduced through the door E and conveniently withdrawn through the same. The compartment for wood is thus made of ample extent.

The front wall of the coal-pocket is provided with a sliding door G, moving in suitable ways and operated by means of a cord or chain $d$, passing over suitable pulleys and extending to the exterior of the end of the cabinet, where it may be supplied with a suitable weight or counterbalance $e$ within convenient reach of the hand.

The coal descends in the pocket by gravity and is directed to the opening covered by the sliding door G, through which it will pass when the door is opened. The door G is intended to be made heavy enough so that it will automatically close after it has been raised. Extending from the bottom of the coal-pocket and to the front wall of the cabinet is a plate f, on which the coal from the pocket will be received and from which it may be easily and conveniently shoveled or otherwise removed when the door D is opened. The opening covered by door G extends to the bottom of the coal-pocket.

The supply of coal is introduced into the pocket through the top of the cabinet, all other interior fittings in the top of the cabinet having been first removed.

H is a tray or other receptacle closed at bottom and fitted to bear at top upon the ledge a, which sustains it. This tray is provided with inclined side walls, so as to enter or project down into the coal-pocket when the latter is in place, and it affords a convenient receptacle for dishes, cutlery, or other kitchen utensils. It is to be lifted out when the charge of coal is to be introduced.

When the cabinet is constructed, as thus far explained, the coal and wood, of which it is capable of containing an abundant supply for a day or more, is conveniently stored within it and concealed from view, while it is easy to be reached and withdrawn as it is required for use, and the receptacle H is likewise easily accessible, and when the top B is in place conceals the articles which it may contain.

In Figs. 4 and 5, I is a vessel or box intended for the reception of ice and provisions. This box is fitted to be introduced into the cabinet and is supplied with a flange g at top to rest upon the ledge b of the cabinet-walls, the dimensions of the box I being nearly those of the interior of the cabinet. Around the box I is a protecting-piece, of asbestos or other suitable non-conducting material, (represented at K,) the same being fluted or corrugated, so as to form air-spaces between the cabinet and the box, the better to insure against undue radiation of heat from the box or penetration of heat from the exterior. At h h are rests of suitable character to support interior shelves, as at i, of which shelves there may be any desired number. The front of the box I is open and the bottom is provided with a suitable closed portion k to catch the drip from the ice and to hold the ice, if necessary. Access to the ice-box or provision-chamber is had through the doors D and E.

With the ice and provision box the receptacle H may be employed, if desired, same as with the coal-pocket, and this receptacle, together with the cover B, affords a double cover for the ice-box to effectually prevent radiation through the upper part.

The coal-pocket is easily withdrawn through the top of the cabinet, and it may then easily be replaced by the ice-box, and the ice-box may as easily be replaced by the coal-pocket, so that the cabinet is fitted for convenient and advantageous use both in summer and in winter.

Being constructed and arranged in accordance with the foregoing explanations the improved kitchen-cabinet will be found to admirably answer all the purposes or objects of the invention hereinbefore alluded to.

Having now fully described my invention, what I claim as new herein, and desire to secure by Letters Patent, is—

1. In a kitchen-cabinet having a door in front, the combination with the casing of an interior removable coal-pocket provided with a sliding door, and means for operating the sliding door from the exterior, substantially as and for the purposes explained.

2. In a kitchen-cabinet, the combination with the casing, of a removable coal-pocket and a removable dish or utensil receptacle located in the upper end of said pocket, and the cabinet-cover, substantially as and for the purposes set forth.

3. In a kitchen-cabinet, the combination with the casing having the doors, of an interior removable coal-pocket provided with a sliding door, the front and end walls of the pocket being inclined and the pocket serving to divide the interior of the cabinet into separate compartments for coal and wood, substantially as and for the purposes set forth.

4. In a kitchen-cabinet, the combination with the casing having the doors, of an interior removable coal-pocket having an inclined front wall and a sliding door mounted in said wall, and a plate extending from the front wall of the coal-pocket to the front wall of the cabinet for receiving the coal as it passes from the coal-pocket, substantially as and for the purposes set forth.

5. The herein-described kitchen-cabinet, the same being composed of the vertical walls having doors, a removable top, the upper portion of the cabinet being supplied with ledges to receive flanges on the tops of the interior removable vessels or receptacles, and the interior vessels arranged to be supported on the ledges, the parts being combined and arranged substantially as shown and for the purposes set forth.

In testimony whereof I have signed my name to this specification in the presence of two subscribing witnesses.

CARL GUSTAVF SWAHN.

Witnesses:
C. SEDGWICK,
ERNST LUNDGREN.